(12) United States Patent
Oosaki

(10) Patent No.: US 9,398,192 B2
(45) Date of Patent: Jul. 19, 2016

(54) IMAGE-READING DEVICE THAT ELIMINATES SHOW-THROUGH FROM ORIGINAL

(71) Applicant: BROTHER KOGYO KABUSHIKI KAISHA, Nagoya, Aichi (JP)

(72) Inventor: Masayoshi Oosaki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/792,830

(22) Filed: Jul. 7, 2015

(65) Prior Publication Data
US 2016/0014302 A1 Jan. 14, 2016

(30) Foreign Application Priority Data

Jul. 14, 2014 (JP) ................................. 2014-143897

(51) Int. Cl.
| H04N 1/46 | (2006.01) |
| H04N 1/04 | (2006.01) |
| H04N 1/409 | (2006.01) |
| H04N 1/028 | (2006.01) |
| H04N 1/00 | (2006.01) |

(52) U.S. Cl.
CPC ......... *H04N 1/4095* (2013.01); *H04N 1/00806* (2013.01); *H04N 1/02815* (2013.01); *H04N 1/0408* (2013.01)

(58) Field of Classification Search
CPC ............ H04N 1/4095; H04N 1/00806; H04N 1/02815; H04N 1/0408
USPC ............................ 358/461, 406, 504; 382/274
See application file for complete search history.

(56) References Cited

U.S. PATENT DOCUMENTS

| 6,862,117 | B1 * | 3/2005 | Ford | ..................... | H04N 1/4095 |
| | | | | | 250/208.1 |
| 2008/0247003 | A1 * | 10/2008 | Jeong | ................... | H04N 1/4095 |
| | | | | | 358/475 |
| 2009/0080034 | A1 * | 3/2009 | Yamagishi | ......... | G03G 15/5025 |
| | | | | | 358/465 |
| 2009/0185237 | A1 * | 7/2009 | Tanaka | .................... | H04N 1/125 |
| | | | | | 358/461 |
| 2010/0195165 | A1 * | 8/2010 | Jeong | .................. | H04N 1/00002 |
| | | | | | 358/474 |
| 2012/0170083 | A1 * | 7/2012 | Joh | ..................... | H04N 1/00013 |
| | | | | | 358/475 |
| 2015/0256715 | A1 * | 9/2015 | Ikari | .................... | H04N 1/4095 |
| | | | | | 358/3.24 |
| 2015/0281504 | A1 * | 10/2015 | Hori | ................... | H04N 1/02885 |
| | | | | | 358/461 |

FOREIGN PATENT DOCUMENTS

| JP | 2003-152968 A | 5/2003 |
| JP | 2003-198810 A | 7/2003 |
| JP | 2004-193744 A | 7/2004 |
| JP | 2013-070208 A | 4/2013 |

* cited by examiner

*Primary Examiner* — Cheukfan Lee
(74) *Attorney, Agent, or Firm* — Scully, Scott, Murphy & Presser, PC

(57) ABSTRACT

In an image-reading device, a controller is configured to control a reading unit to read a reference plate to generate reference image data and to read a first and second faces of an original to generate first and second image data; identify a show-through line including a show-through region in which the first face depicts a first background color and the second face has a highest density value and a non-show-through region in which the first face depicts the first background color and the second face depicts a second background color; calculate an image data ratio of the show-through and non-show-through regions in the first image data; calculate a reference data ratio of the show-through and non-show-through regions in the reference image data; and determine a show-through removal light intensity such that a difference between the image data ratio and the reference data ratio falls within a prescribed range.

7 Claims, 16 Drawing Sheets

BACKGROUND COLOR REGION AR1
(Xa+1,Xh):Y0~Yb,Yc+1~Ye,Yf+1~Yn
(Xa+1,Xb):Yb+1~Yc,Ye+1~Yf          (Xg+1,Xh):Yb+1~Yc,Ye+1~Yf

BACKGROUND COLOR REGION BR1
(Xa+1,Xh):Y0~Ya,Yg+1~Yn
(Xa+1,Xb):Yb+1~Yc,Ye+1~Yf          (Xf+1,Xh):Yb+1~Yc,Ye+1~Yf
(Xa+1,Xc):Ya+1~Yb,Yc+1~Ye,Yf+1~Yg  (Xf+1,Xh):Ya+1~Yb,Yc+1~Ye,Yf+1~Yg

HIGH-DENSITY REGION          ADJUSTMENT LINE
(Xd,Xe):Yd                   Yd

IMAGE-READING DEVICE THAT ELIMINATES SHOW-THROUGH FROM ORIGINAL

CROSS REFERENCE TO RELATED APPLICATION

This application claims priority from Japanese Patent Application No. 2014-143897 filed Jul. 14, 2014. The entire content of the priority application is incorporated herein by reference.

TECHNICAL FIELD

The present disclosure relates to an image-reading device that eliminates show-through when reading an original.

BACKGROUND

When the original being read is a thin sheet of paper and the inner surface of the original cover that holds the original in place is white, an image formed on the back surface of the original may be reflected off the original cover, transmitted through the original, and picked up by the image-reading device. This phenomenon is called "show-through" and results in the image data for the front surface including a transposed image of the back surface. The image-processing device described in Japanese Patent Application Publication No. 2013-70208 modifies the light intensity emitted from a light source for reading an original between a first intensity and a second intensity smaller than the first intensity; reading the image on the original at both light intensities and converting the reflected light to first image data and second image data, respectively; and creating third image data having no show-through based on the luminance difference between the first image data and second image data.

SUMMARY

However, since the second light intensity is predetermined, the amount of light transmitted through the original will vary according to the type of paper constituting the original. Since it follows that the degree of show-through varies among different paper types, such show-through may still be produced in an image read from the original according to the conventional image-processing device described above.

In view of the foregoing, it is an object of the disclosure to provide an image-reading device that reduces the occurrence of show-through in images read from originals of different paper types.

In order to attain the above and other objects, one aspect provides an image-reading device that includes: a light source; a reading unit; a reference plate; an adjusting unit; and a controller. The light source is configured to irradiate light toward an original having a first face and a second face. The light irradiated theretoward has a light intensity. The reading unit is configured to read the original on a line-to-line basis in a main scanning direction by receiving the light reflected off the original. The reference plate is disposed in a position confronting the reading unit. The adjusting unit is configured to adjust the light intensity of the light source. The controller is configured to: control the light source to irradiate the light toward the reference plate and control the reading unit to read the reference plate to generate reference image data; control the light source to irradiate the light toward the first face of the original and control the reading unit to read the first face of the original to generate first image data corresponding to the first face of the original; control the light source to irradiate the light toward the second face of the original and control the reading unit to read the second face of the original to generate second image data corresponding to the second face of the original; acquire a first background color from the first image data and a second background color from the second image data; identify a first background color region in the first image data and a second background color region in the second image data, the first background color region defining a region in which the first face of the original depicts the first background color, the second background color region defining a region in which the first face of the original depicts the first background color and the second face of the original depicts the second background color; acquire a highest density value in the first background color region from the second image data; identify a show-through line including a show-through region and a non-show-through region in the second image data based on the second background color and the highest density value, the show-through region corresponding to the highest density value, the non-show-through region defining a region in which the first face of the original depicts the first background color and the second face of the original depicts the second background color; control the light source to irradiate the light toward the first face of the original and control the reading unit to read the show-through region and the non-show-through region in the first face of the original to generate third image data and fourth image data; calculate an image data ratio of the third image data to the fourth image data; calculate a reference data ratio of first reference data to second reference data, the first reference data being image data corresponding to the show-through region in the reference image data, the second reference data being image data corresponding to the non-show-through region in the reference image data; calculate a difference between the image data ratio and the reference data ratio and determine a show-through removal light intensity such that the difference falls within a prescribed range; and control the adjusting unit to adjust the light intensity of the light source to the show-through removal light intensity.

BRIEF DESCRIPTION OF THE DRAWINGS

The particular features and advantages of the disclosure as well as other objects will become apparent from the following description taken in connection with the accompanying drawings, in which.

DETAILED DESCRIPTION

[Embodiment]

Figure 1:
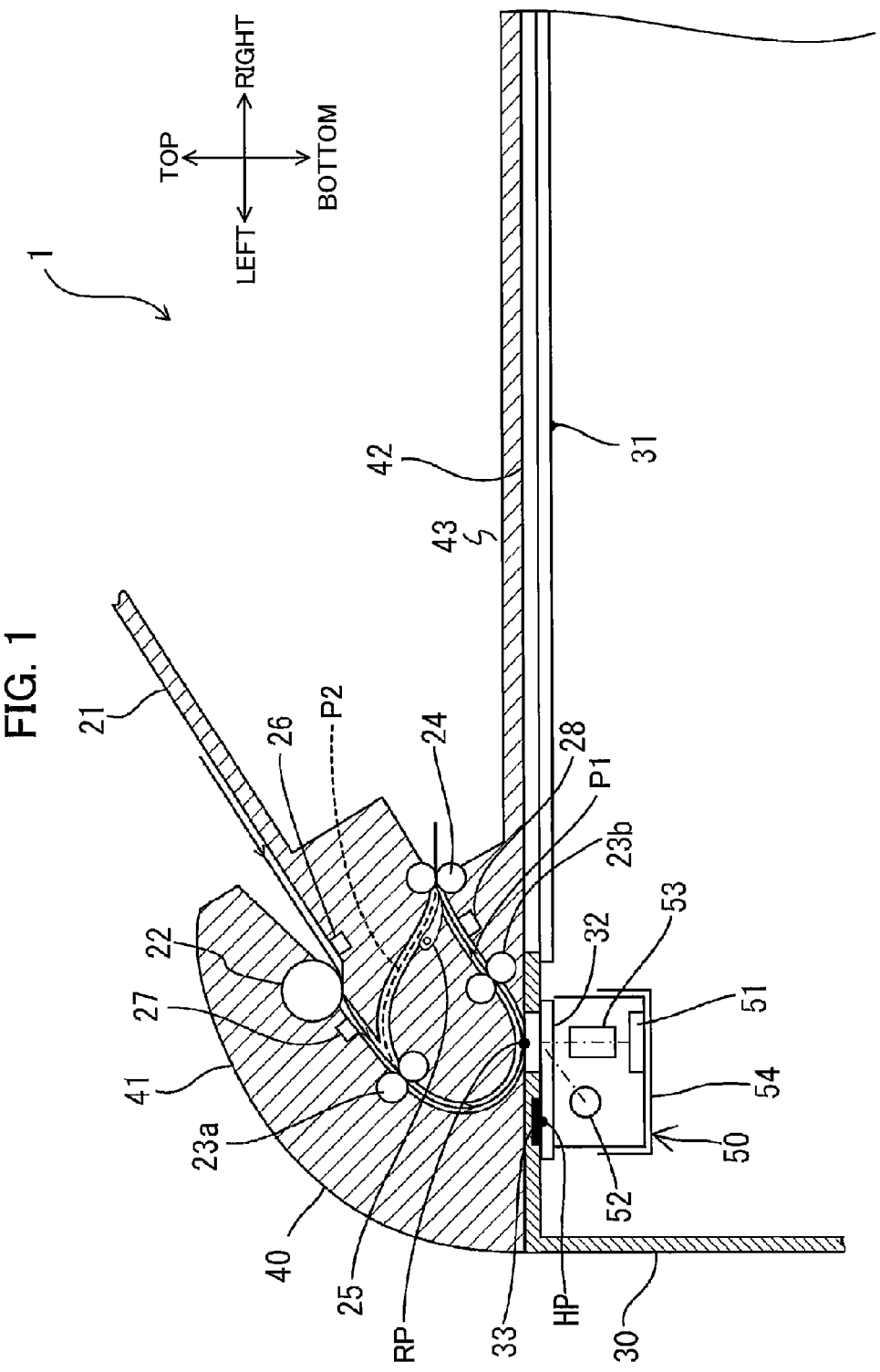
FIG. 1 is a cross-sectional view showing an internal structure of an image-reading device according to an embodiment.

Next, an image-reading device 1 according to a preferred embodiment of the present disclosure will be described while referring to the accompanying drawings wherein like parts and components are designated by the same reference numerals to avoid duplicating description. Arrows in FIG. 1 indicate vertical and left-right directions used in the following description in relation to the image-reading device 1.

(Overall Structure of the Image-Reading Device 1)

FIG. 1 is a cross-sectional view of the image-reading device 1. The image-reading device 1 includes a body 30, and a cover 40. The body 30 includes a first transparent plate 31, a second transparent plate 32, a reference plate 33, and a reading unit 50. The cover 40 includes an automatic document feeding (ADF) mechanism 41, an original cover plate 42, and a discharge unit 43.

The reading unit 50 is capable of moving relative to the body 30 along a sub scanning direction (the left-right direction in FIG. 1). The reading unit 50 can read either an original conveyed by the ADF mechanism 41 or an original placed on the first transparent plate 31. The reading unit 50 includes a contact image sensor (CIS), and a carriage 54. The CIS includes an imaging element 51, a light source 52, and a rod lens 53. The light source 52 can produce light in a plurality of colors and functions to irradiate light in each color toward the original. Light irradiated from the light source 52 is reflected off the original and passes through the rod lens 53 to be received by the imaging element 51. The imaging element 51 is more specifically configured of a plurality of photoelectric conversion elements aligned in a main scanning direction (the vertical direction in FIG. 1). Hence, the imaging element 51 is a line sensor that reads an original in units of lines extending in the main scanning direction, i.e., the direction in which the photoelectric conversion elements are aligned. The reading unit 50 executes a reading operation at a read position RP corresponding to the second transparent plate 32.

The ADF mechanism 41 includes an original tray 21, a sheet-feeding roller 22, pairs of conveying rollers 23a and 23b, discharge rollers 24, a path-switching mechanism 25, an original sensor 26, a rear sensor 27, and a discharge sensor 28. The ADF mechanism 41 conveys sheets of an original placed in the original tray 21 to the read position RP and subsequently discharges the sheets into the discharge unit 43. More specifically, when the original sensor 26 detects an original on the original tray 21, the sheet-feeding roller 22 feeds the original downstream in a feeding direction one sheet at a time. The rear sensor 27 is disposed between the sheet-feeding roller 22 and conveying rollers 23a for detecting an original sheet fed by the sheet-feeding roller 22. When the rear sensor 27 detects an original sheet fed by the sheet-feeding roller 22, the conveying rollers 23a and 23b convey the sheet to the read position RP. Subsequently, when the discharge sensor 28 detects the original sheet, the discharge rollers 24 discharge the sheet into the discharge unit 43. The reading unit 50 executes a reading operation on the original at the read position RP through the second transparent plate 32. An original presser (not shown) is provided at the read position RP for pressing the original against the second transparent plate 32. The original presser is white in the preferred embodiment.

The path-switching mechanism 25 is disposed at the converging point of a first path P1 extending from the conveying rollers 23b to the discharge rollers 24, and a second path P2 extending from the discharge rollers 24 to the conveying rollers 23a. The path-switching mechanism 25 opens the first path P1 when an original is conveyed along the first path P1, and opens the second path P2 when an original is not conveyed along the first path P1.

By rotating in reverse to the discharging direction, the discharge rollers 24 can convey an original sheet along the second path P2. Specifically, after the discharge rollers 24 have conveyed an original sheet along the first path P1 by rotating in the discharging direction and while the trailing edge of the sheet is still nipped by the discharge rollers 24, the discharge rollers 24 are rotated in reverse and, with the path-switching mechanism 25 positioned to open the second path P2, convey the original sheet into the second path P2. In this way, the image-reading device 1 can convey an original sheet fed by the sheet-feeding roller 22 so that the front surface of the sheet passes over the reading unit 50, and can convey the original sheet onto the second path P2 by reversing the discharge rollers 24 when the trailing edge of the sheet is nipped thereby so that the back surface of the sheet passes over the reading unit 50. While the path-switching mechanism 25 and discharge rollers 24 described above are used as the configuration for reversing an original sheet, the image-reading device 1 may be suitably modified to adopt another configuration known in the art, such as special switching rollers used to reverse the direction of the original sheet.

The reference plate 33 is disposed in a position confronting the reading unit 50 through the second transparent plate 32. The reference plate 33 is white in color and is used for acquiring white data and black data described later. In the following description, the position in the sub scanning direction at which the reference plate 33 is provided will be called the home position HP.

(Electrical Structure of the Image-Reading Device 1)

Figure 2:
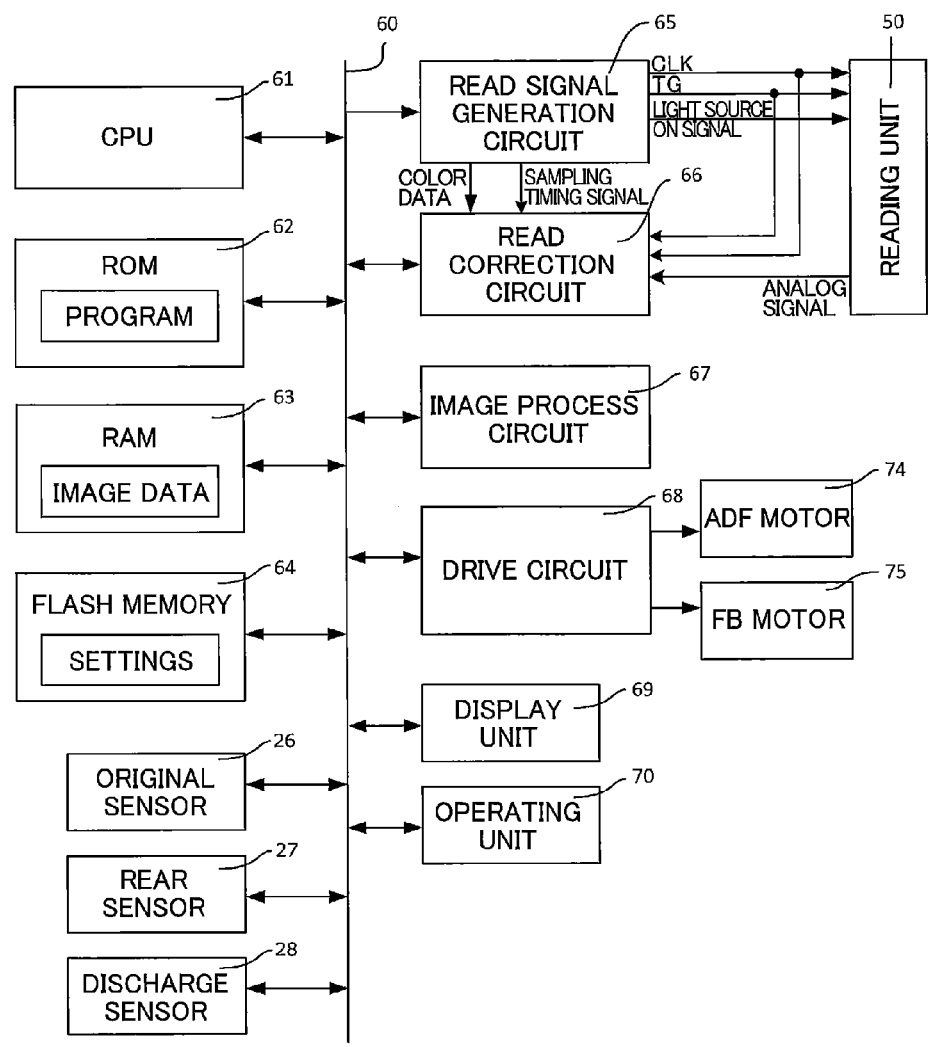
FIG. 2 is a block diagram showing an electrical structure of the image-reading device.

FIG. 2 shows the electrical structure of the image-reading device 1. The image-reading device 1 includes a CPU 61, a ROM 62, a RAM 63, a flash memory 64, a read signal generation circuit 65, a read correction circuit 66, an image process circuit 67, and a drive circuit 68. These components of the image-reading device 1 are connected via a bus 60 to a display unit 69 and an operating unit 70, as well as the original sensor 26, rear sensor 27, and discharge sensor 28 described above.

The ROM 62 stores programs for executing the operations of the image-reading device 1, such as a reading process and various subroutine processes described later. The CPU 61 controls the components of the image-reading device 1 based on the programs read from the ROM 62. The flash memory 64 is a readable and writable nonvolatile memory that stores various data generated during control processes performed by the CPU 61, settings for the reading unit 50, and the like. The RAM 63 temporarily stores the results of calculations generated during control processes performed by the CPU 61, image data (digital data and gradation values described later), and the like.

The drive circuit 68 is further connected to an ADF motor 74 and a flatbed (FB) motor 75 and drives the ADF motor 74 and FB motor 75 based on drive commands from the CPU 61. The drive circuit 68 drives the ADF motor 74 and FB motor 75 based on a rotation amount and direction indicated in the drive command. When the ADF motor 74 is driven in a forward rotation, the sheet-feeding roller 22, conveying rollers 23a and 23b, and discharge rollers 24 rotate forward to convey an original sheet from the original tray 21 toward the discharge unit 43. When the ADF motor 74 is rotated in reverse, the discharge rollers 24 rotate in reverse while the conveying rollers 23a and 23b rotate in the forward direction.

The read signal generation circuit generates a light source ON signal, a clock signal CLK, a line start signal TG, a sampling timing signal, and color data respectively. The light source ON signal controls the value of electric current flowing to the light source 52 and whether the light source 52 is on or off. The clock signal CLK sequentially activates each photoelectric conversion element of the imaging element 51. The line start signal TG activates the imaging element 51 for each line. The sampling timing signal designates the timing for capturing image data outputted from each photoelectric conversion element of the imaging element 51. The color data represents the color that the light source 52 is currently outputting. The color data represents red, green, blue, and their composite color when all three are turned on simultaneously. Upon receiving the clock signal CLK, line start signal TG, and light source ON signal from the read signal generation circuit 65, the reading unit 50 lights the light source 52 and transmits analog signals corresponding to the amount of light received by the imaging element 51 to the read correction circuit 66. An analog signal is outputted for each photoelectric conversion element. Accordingly, the number of outputted analog signals is equivalent to the number of photoelectric conversion elements, i.e., the number of pixels in one line. Analog signals are outputted in sequence from a first pixel L0 to a last pixel Ln.

Figure 3:
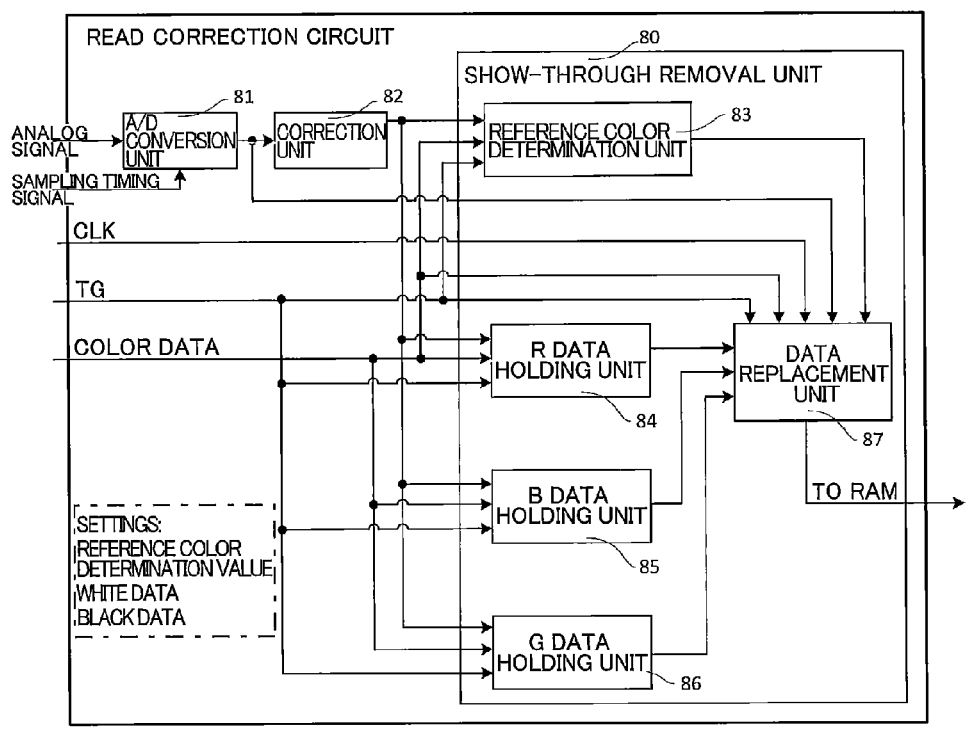
FIG. 3 is a block diagram of a read correction circuit of the image-reading device.

As shown in FIG. 3, the read correction circuit 66 includes an A/D conversion unit 81, a correction unit 82, and a show-through removal unit 80. The A/D conversion unit 81 converts an analog signal transmitted from the reading unit 50 to digital data. The correction unit 82 executes shading compensation on the digital data converted by the A/D conversion unit 81 using black data and white data stored in the flash memory 64. The show-through removal unit 80 executes a show-through removal process on gradation values represented by the digital data, after the digital data has undergone shading compensation in the correction unit 82, and stores the gradation values with show-through removed in the RAM 63. The show-through removal unit 80 will be described later in greater detail. The image process circuit 67 performs various image processes on the digital data, i.e., the gradation values, stored in the RAM 63. These image processes include correction processes, such as gamma correction and color conversion correction, and a resolution conversion process.

The show-through removal unit 80 includes an R data holding unit 84, a B data holding unit 85, a G data holding unit 86, a reference color determination unit 83, and a data replacement unit 87. Each of the data holding units 84, 85, and 86 is connected to the correction unit 82. While the color data signal indicates the color red, the R data holding unit 84 holds one line worth of gradation values in synchronization with the clock signal CLK for the line specified by the line start signal TG. Similarly, the B data holding unit 85 holds one line worth of gradation values when the color data signal indicates blue, and the G data holding unit 86 holds one line worth of gradation values when the color data signal indicates green.

The reference color determination unit 83 is connected to the correction unit 82 and functions to determine whether a gradation value is a reference color acquired in a process described later. Here, the reference color is the background color of the original. More specifically, while the color data signal indicates the color produced when all these colors are simultaneously, the reference color determination unit 83 outputs a reference color signal to the data replacement unit 87 for each pixel in the line specified by the line start signal TF whose gradation value matches the reference color read when irradiating light in all three colors simultaneously. A reference color is stored in the flash memory 64 for each color. In the preferred embodiment, the flash memory 64 stores reference colors corresponding to red, blue, green, and the color produced when all three colors are on simultaneously.

The data replacement unit 87 replaces the gradation values held by the R data holding unit 84, B data holding unit 85, and G data holding unit 86 with the corresponding reference color based on the reference color signals. More specifically, when a replacement flag is ON and the color data indicates the color produced when all three colors are on simultaneously, the data replacement unit 87 replaces the gradation values held by the R data holding unit 84, B data holding unit 85, and G data holding unit 86 in synchronization with the clock signal CLK in the line specified by the line start signal TG with the reference color data based on the reference signals. That is, the data replacement unit 87 replaces gradation values for each color with the corresponding reference color in synchronization with the clock signal CLK when a reference color signal is inputted and outputs the gradation values in the corresponding data holding units when a reference color signal is not inputted. The outputted replacement data or gradation value in each data holding unit is stored in the RAM 63.

The data replacement unit 87 also stores digital data received from the A/D conversion unit 81 in the RAM 63. Thus, when the replacement flag is OFF, the data replacement unit 87 stores digital data received from the A/D conversion unit 81 in the RAM 63 in synchronization with the clock signal CLK for the line indicated by the line start signal TG.

(Operations of the Image-Reading Device 1)

Next, operations performed on the image-reading device 1 will be described with reference to the drawings. The image-reading device 1 is capable of performing a show-through removal reading process to eliminate show-through from an original. Specifically, the image-reading device 1 executes a light intensity adjusting pre-process (M1) prior to executing the show-through removal reading process, and a main reading process (M2) to implement either the show-through removal reading process or a normal reading process. The CPU 61 executes the process in steps T1-T8 for the light intensity adjusting pre-process, the process in steps R1-R8 for the main reading process, and the steps for each subroutine for these processes.

(Light Intensity Adjusting Pre-Process)

Figure 4:
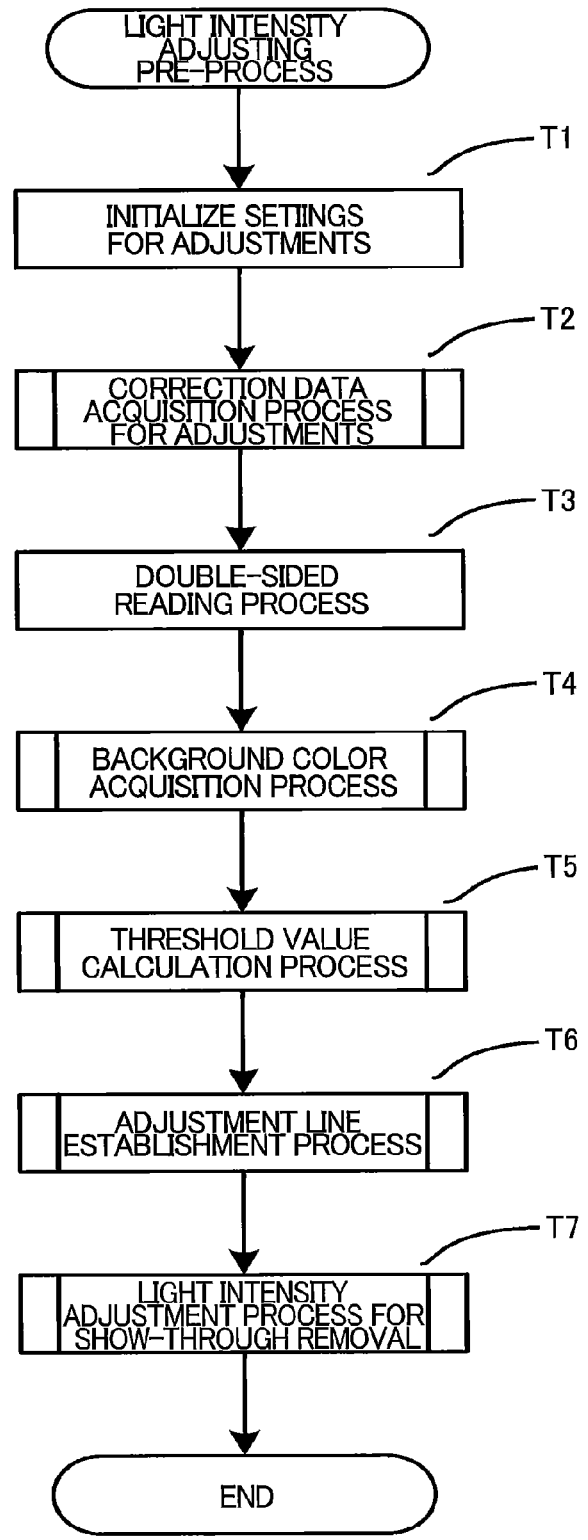
FIG. 4 is a flowchart illustrating steps in a light intensity adjusting pre-process.

The light intensity adjusting pre-process (M1) shown in FIG. 4 begins in response to a user operation on the operating unit 70 of the image-reading device 1 while the original sensor 26 has detected an original in the original tray 21. The example in the preferred embodiment applies to a case of performing a show-through removal process during a color reading operation. The light intensity adjusting pre-process adjusts the amount of light used when executing this show-through removal reading process.

In T1 at the beginning of the light intensity adjusting pre-process, the CPU 61 initializes various data. For example, the CPU 61 initializes the line period and pixel period of the imaging element 51; and the start lighting time, end lighting time, lighting color, and electric current value for the light source 52.

In T2 the CPU 61 acquires correction data. The correction data acquisition process for adjustments (T2) is performed to acquire white data WS and black data required when performing shading compensation. This process will be described later in greater detail.

In T3 the CPU 61 acquires image data for both sides of the original sheet. Here, the CPU 61 outputs a drive command to the drive circuit 68 to move the reading unit 50 to the read position RP and to drive the ADF mechanism 41 to convey the original sheet such that its front surface passes the read position RP. The CPU 61 then controls the reading unit 50 to execute a read operation on the front surface. Next, the CPU 61 controls the read correction circuit 66 to correct the reading results for the front surface to gradation values that have undergone shading compensation based on the black data and white data WS, and saves the resulting gradation values in the RAM 63 as front image data representing one page worth of gradation values. Subsequently, the CPU 61 outputs a reverse drive command to the drive circuit 68 for controlling the ADF mechanism 41 to reverse the direction of the original sheet and to convey the sheet so that its back surface passes the read position RP. The CPU 61 controls the reading unit 50 to execute a read operation on this back surface, controls the read correction circuit 66 to correct the reading results for the back surface to gradation values that have undergone shading compensation based on the black data and the white data WS, and saves the resulting gradation values in the RAM 63 as back image data representing one page worth of gradation values.

In T4 the CPU 61 acquires the background color for both front and back surfaces of the original sheet. The background color acquisition process (T4) serves to acquire a background color A for the front surface and a background color B for the back surface. This process will be described later in greater detail.

In T5 the CPU 61 calculates a threshold value. The threshold value calculation process (T5) is performed to calculate a threshold value at an adjustment line selected for determining a light intensity adjustment. The threshold value is used to determine whether to adjust the light intensity when executing the show-through removal reading process. This process will be described later in greater detail.

In T6 the CPU 61 establishes an adjustment line. The adjustment line establishment process (T6) is performed to establish an adjustment line used as the position on the original sheet at which a light intensity adjustment process is performed based on front image data and back image data. The adjustment line establishment process (T6) also serves to acquire a high-density region on the adjustment line in which show-through occurs, and a background color region BR1 in which both front and back surfaces depict their background colors. This process will be described later in greater detail.

In T7 the CPU 61 executes a process for adjusting the light intensity used during the show-through removal reading process. Here, the CPU 61 controls the ADF mechanism 41 to convey the original sheet until the adjustment line is at the read position RP, and adjusts the light intensity based on an output ratio of the high-density region and background color region BR1. This process will be described later in greater detail. After the CPU 61 adjusts this light intensity, the light intensity adjusting pre-process (M1) ends.

(Correction Data Acquisition Process for Adjustments)

Figure 5:
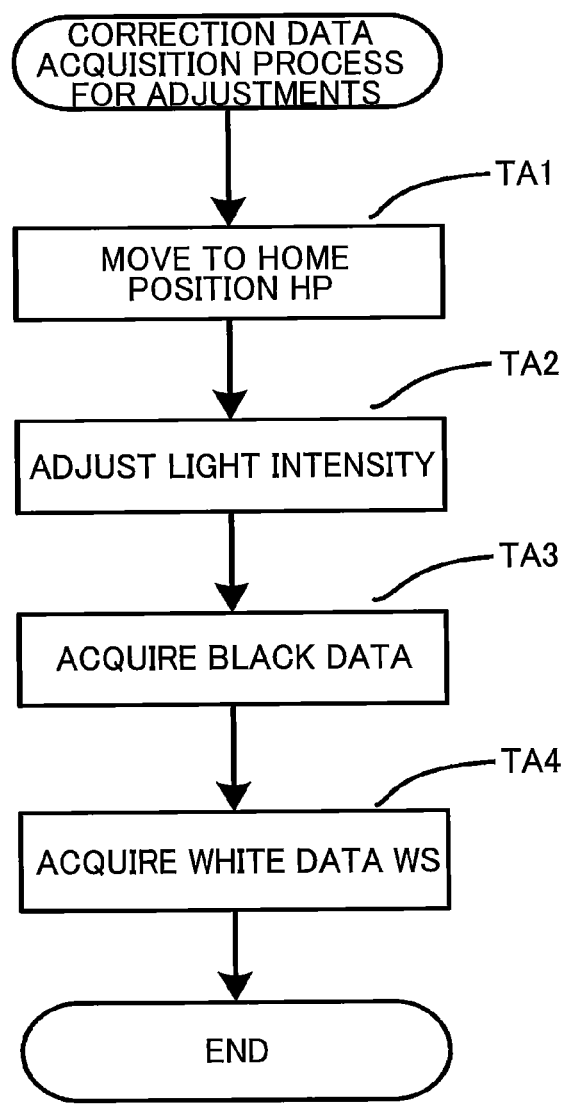
FIG. 5 is a flowchart illustrating steps in a correction data acquisition process for adjustments.

Next, the correction data acquisition process for adjustments (T2) will be described with reference to FIG. 5. In this process, the CPU 61 acquires white data WS and black data. In TA1 of FIG. 5, the CPU 61 outputs a drive command to the drive circuit 68 for controlling the FB motor 75 to move the reading unit 50 to the home position HP.

In TA2 the CPU 61 adjusts the light intensity IS to be used in the reading operation. More specifically, the CPU 61 controls the light source 52 to irradiate light toward the reference plate 33 and adjusts the light intensity IS of the light source 52 so that the analog signal produced when the reflected light is captured is the maximum value of the A/D conversion unit 81. Here, the light intensity IS is set as the lighting time and electric current value of the light source 52 for one line.

In TA3 the CPU 61 acquires black data. More specifically, the CPU 61 turns off the light source 52, controls the reading unit 50 to read one line, and stores the digital data produced from the read in the RAM 63 as black data.

In TA4 the CPU 61 acquires the white data WS. More specifically, the CPU 61 turns on the light source 52 at the light intensity IS, controls the reading unit 50 to read one line, and stores the digital data produced from the read in the RAM 63 as the white data WS.

(Background Color Acquisition Process)

Figure 6:
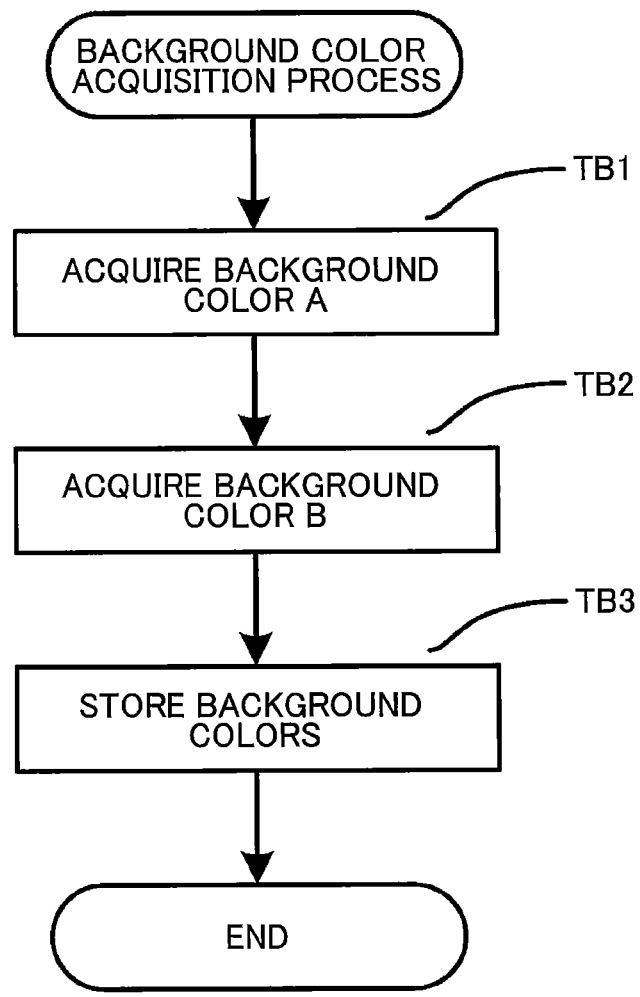
FIG. 6 is a flowchart illustrating steps in a background color acquisition process.

Next, the background color acquisition process (T4) will be described with reference to FIG. 6. In this process, the CPU 61 acquires the background color A for the front surface of the original sheet and the background color B for the back surface of the sheet. In TB1 of FIG. 6, the CPU 61 performs a process to acquire the background color A. Here, the CPU 61 creates a histogram recording the number of instances for each gradation value in the front image data acquired in the double-sided reading process (T3). The CPU 61 acquires the most frequent value, i.e., the gradation value in the histogram having the largest number, as the background color A. Similarly, in TB2 the CPU 61 acquires the background color B. Here, the CPU 61 creates a histogram recording the number of instances for each gradation value in the back image data and acquires the most frequent value, i.e., the gradation value having the largest number, as the background color B. In TB3 the CPU 61 stores the background color A and background color B in the RAM 63.

(Threshold Value Calculation Process)

Figure 7:
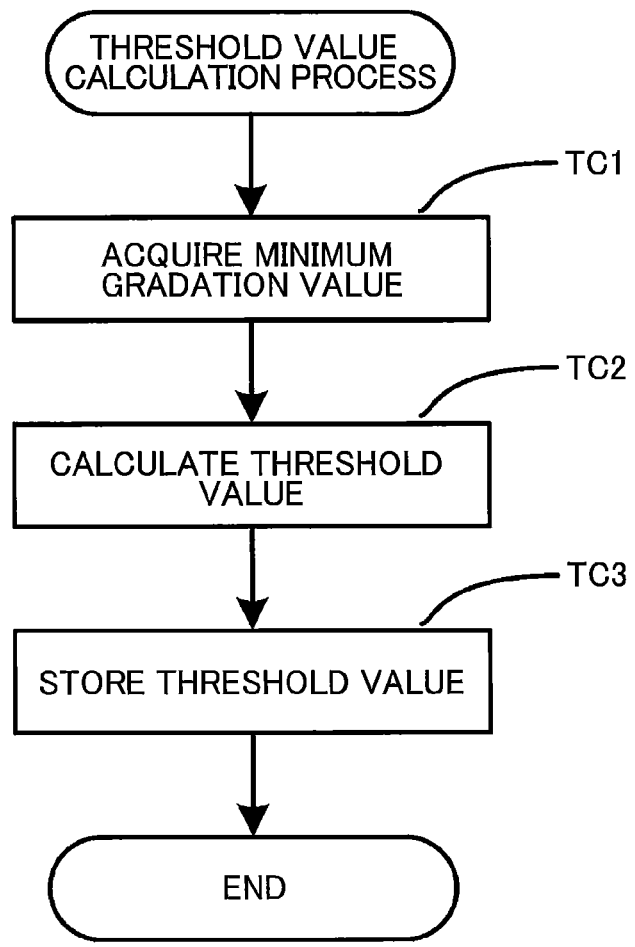
FIG. 7 is a flowchart illustrating steps in a threshold value calculation process.

Next, the threshold value calculation process (T5) will be described with reference to FIG. 7. In TC1 of FIG. 7, the CPU 61 acquires the minimum gradation value, i.e., the smallest gradation value, from the back image data. In TC2 the CPU 61 calculates a threshold value by adding a predetermined value (20% of the minimum gradation value, for example) to the minimum gradation value. In TC3 the CPU 61 stores this threshold value in the RAM 63.

(Adjustment Line Establishment Process)

Next, the adjustment line establishment process (T6) will be described with reference to FIG. 8. In TD1 the CPU 61 acquires a background color region AR1 from the front image data that depicts the background color A. The background color region AR1 is identified by its positions in the main scanning direction and its positions in the sub scanning direction. The positions in the main scanning direction correspond to the positions of the photoelectric conversion elements in the imaging element 51 (hereinafter referred to as the "pixel positions"). The positions in the sub scanning direction correspond to relative positions between the original and the imaging element 51 (hereinafter referred to as the "line positions"). The background color region BR1 described later is similarly identified by pixel positions and line positions.

Figure 15A:
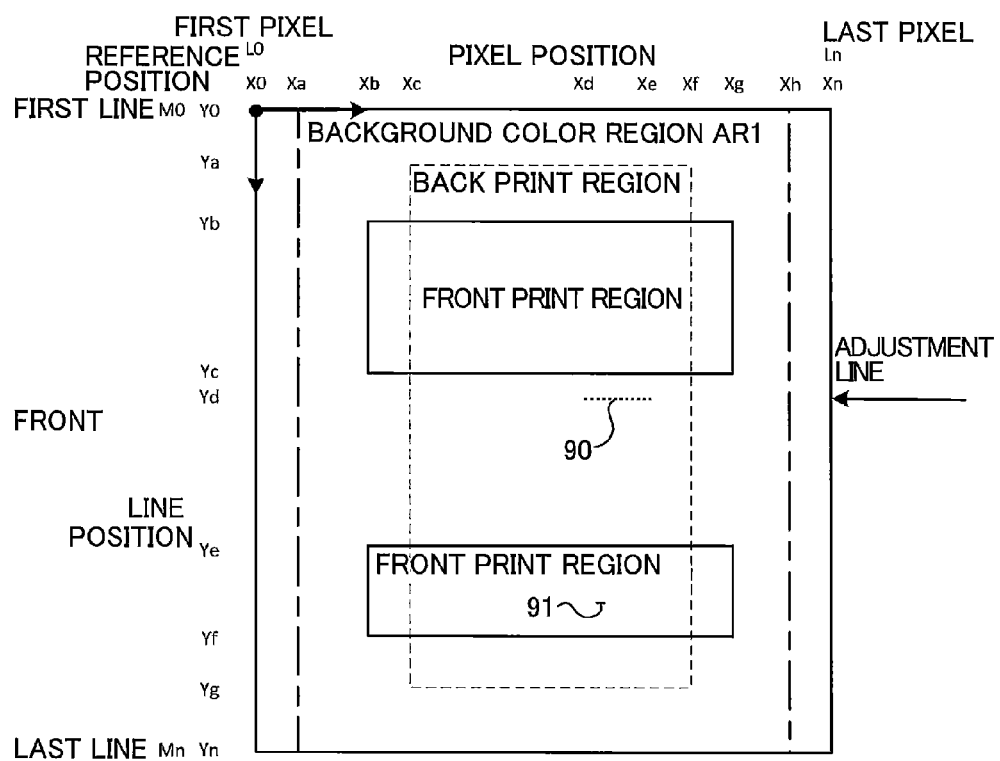
FIG. 15A is an explanatory diagram showing a relationship between front image data and pixel positions and line positions.
Figures 15B, 15C:
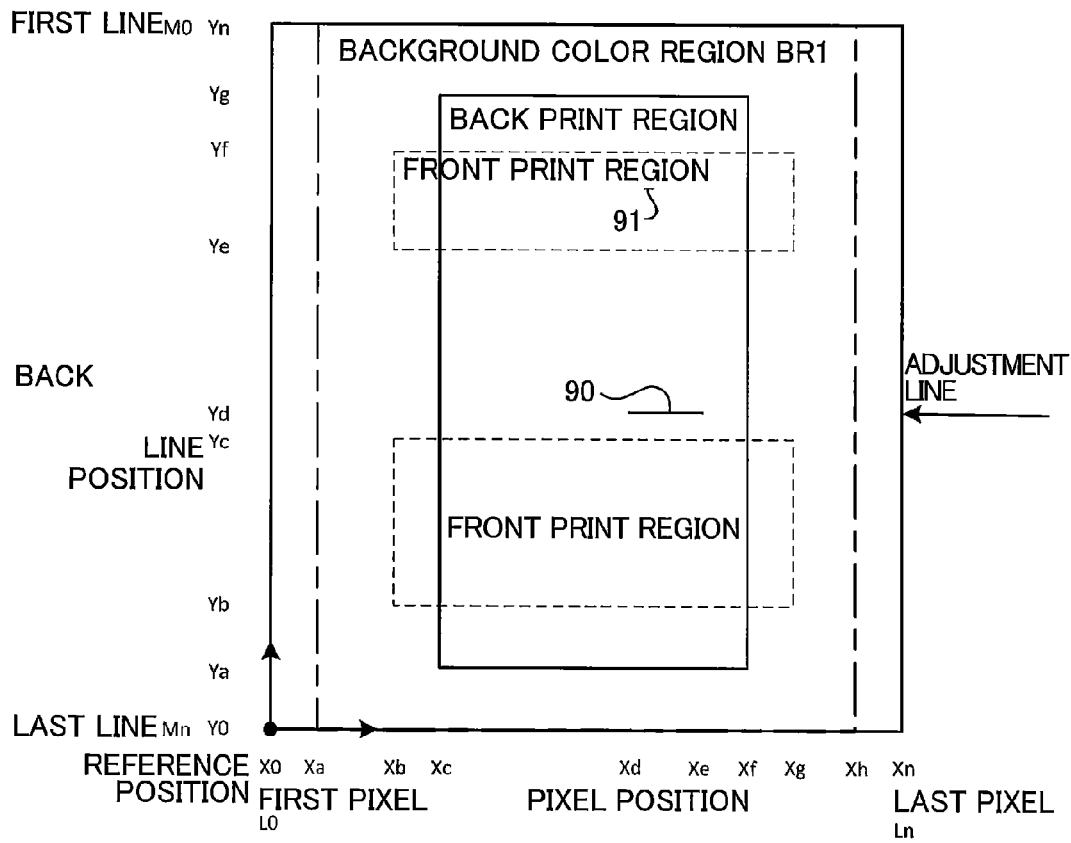
FIG. 15B is an explanatory diagram showing a relationship between back image data and pixel positions and line positions.
FIG. 15C illustrates an example of identifying each region based on pixel positions and line positions.

Next, a supplementary description of the background color region AR1 will be given with reference to FIG. 15. FIG. 15A shows an example of front image data. FIG. 15B shows an example of back image data. FIG. 15C illustrates an example of identifying each region based on pixel positions and line positions.

Next, the relationship between image data for both surfaces and pixel positions and line positions will be described with reference to FIG. 15. The reference position for pixel positions and line positions is set to the first pixel L0 and first line M0 for gradation values in the front image data. The pixel position corresponds to the position in the main scanning direction, while the line position corresponds to the position in the sub scanning direction. Pixel positions from the first pixel L0 to the last pixel Ln are converted to coordinates X0 through Xn, and line positions from the first line M0 to the last line Mn are converted to coordinates Y0 through Yn. The reference position in the back image data is set to the first pixel L0 and the last line Mn of the gradation values. The pixel positions from the first pixel L0 to the last pixel Ln are converted to coordinates X0 through Xn, and line positions from the last line Mn to the first line M0 are converted to coordinates Y0 through Yn.

The process of acquiring the background color regions, a high-density region and an adjustment line will be briefly described here, but will be described in greater detail later. FIG. 15A shows two locations of print regions for the front surface (front print regions) enclosed by solid lines. In these regions, the background color is not included in the front image data. The minimum gradation value is set to the gradation value indicated by the front print region having the smallest gradation value. The position defined by a solid line 91 in FIG. 15A is the position of the minimum gradation value in the front print region. The region defined by chain lines in FIG. 15A, but excluding the two front print regions, is the background color region AR1. In FIG. 15B, the region surrounded by a solid line is the print region for the back surface (back print region), whose back image data does not include the background color. The portion of this back print region having the highest density and that is aligned with a region on the front surface depicting the background color is called the "high-density region." The region defined by a solid line 90 in FIG. 15B is the high-density region. The region defined by chain lines in FIG. 15B that overlaps the background color region AR1, excluding the front print regions and back print region, is the background color region BR1.

In FIG. 15A, the background color region AR1 is the portion of the region surrounded by chain lines and solid lines excluding the print regions on the front surface. The front print regions surrounded by solid lines denote the print regions on the front surface, while the back print region surrounded by a dashed line indicates the print region on the back surface. Hence, one region within the background color region AR1 between pixel positions Xa+1 and Xh is the rectangular region defined by the four vertices with pixel positions and line positions [Xa+1, Y0], [Xh, Y0], [Xa+1, Yb], and [Xh, Yb]. Hence, the range of line positions from Y0 to Yb (hereinafter called "line positions Y0-Yb") corresponding to the range of pixel positions from Xa+1 to Xh (hereinafter called "pixel positions (Xa+1, Xh)") defines part of the background color region AR1. Similarly, the range of line positions Yc+1-Ye and Yf+1-Yn are part of the background color region AR1. Hence, line positions Y0-Yb, Yc+1-Ye, and Yf+1-Yn corresponding to pixel positions (Xa+1, Xh) denote the background color region AR1. In addition, regions defined by line positions Yb+1-Yc and Ye+1-Yf corresponding to pixel positions (Xa+1, Xb) and line positions Yb+1-Yc and Ye+1-Yf corresponding to pixel positions (Xg+1, Xh) are included in the background color region AR1. Further, while the high-density region 90 is included in the background color region AR1 in the front image data of FIG. 15A, this high-density region 90 is represented by a dotted line for purposes of this description.

Figure 8:
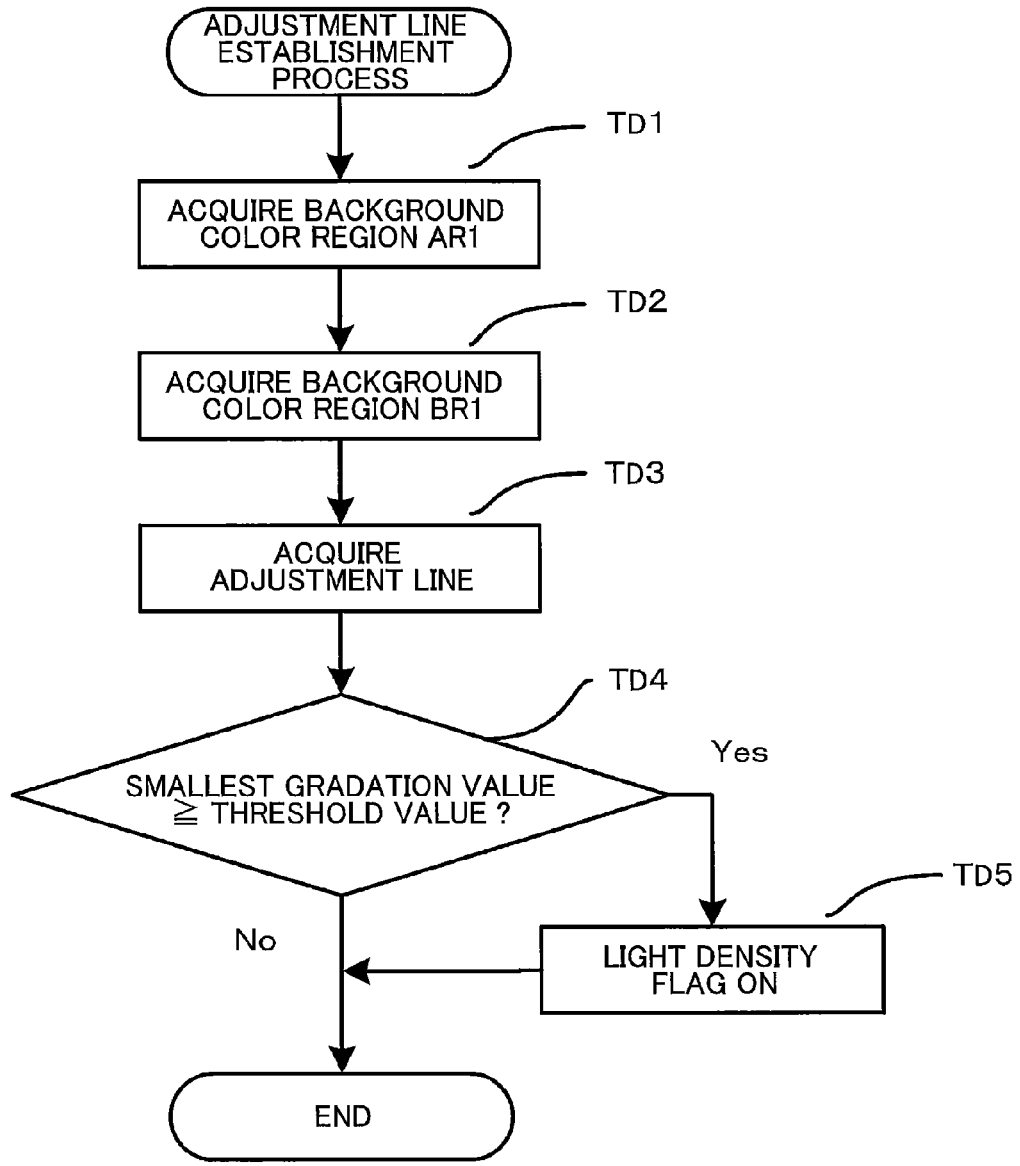
FIG. 8 is a flowchart illustrating steps in an adjustment line establishment process.

Next, in TD2 of FIG. 8, the CPU 61 acquires the portion of the background color region BR1 in which the back image data indicates the background color B that falls within the background color region AR1. The background color region BR1 is the region in which the background color is depicted on both back and front surfaces. This region generally accounts for a large portion of the original. Further, since the background color is generally white, the background color region BR1 is a region in which light is more easily transmitted through most originals but is not a region in which show-through generally occurs. As with background color region AR1, background color region BR1 is identified by pixel positions and line positions. The CPU 61 stores the background color region BR1 acquired in TD2 in the RAM 63.

As shown in FIG. 15B, the background color region BR1 is the portion of the region surrounded by the chain lines and solid lines, excluding the print regions on both surfaces. The region surrounded by solid lines depicts the print region on the back surface, i.e., back print region, while the region surrounded by a dashed line depicts the print region on the front surface, i.e., front print region. Accordingly, part of the background color region BR1 between pixel positions from Xa+1 to Xh is the rectangular region defined by the four vertices with pixel positions and line positions [Xa+1, Y0], [Xh, Y0], [Xa+1, Ya], and [Xh, Ya]. Hence, the region defined by line positions from Y0 to Ya (hereinafter referred to as line positions Y0-Ya) corresponding to the range of pixel positions from Xa+1 to Xh (hereinafter referred to as pixel positions (Xa+1, Xh)) belongs to the background color region BR1. The region defined by line positions Yg+1-Yn corresponding to the same pixel positions also belong to the background color region BR1. Therefore, regions of line positions Y0-Ya and Yg+1-Yn corresponding to pixel positions (Xa+1, Xh) belong to the background color region BR1. Other regions that belong to background color region BR1 are regions having line positions Yb+1-Yc and Ye+1-Yf corresponding to pixel positions (Xa+1, Xb), regions having line positions Yb+1-Yc and Ye+1-Yf corresponding to pixel positions (Xg+1, Xh), regions having line positions Ya+1-Yb, Yc+1-Ye, and Yf+1-Yg corresponding to pixel positions (Xa+1, Xc), and regions having line positions Ya+1-Yb, Yc+1-Ye, and Yf+1-Yg corresponding to pixel positions (Xf+1, Xh). The background color region BR1 is the region in which the background color is depicted on both surfaces and, hence, a region in which show-through does not occur. Further, the high-density region 90 is a region in which the background color is depicted on the front surface and the smallest gradation value is depicted on the back surface. In this example, the high-density region 90 has line position Yd for pixel positions (Xd, Xe).

In TD3 of FIG. 8, the CPU 61 acquires the high-density region 90 among all pixel positions in the background color region AR1 included in all line positions in the background color region BR1. The high-density region 90 is denoted by the smallest gradation value, i.e., the highest density in the back image data. The CPU 61 acquires the high-density region 90, and stores the line position of this high-density region 90 as the adjustment line. As mentioned above, the high-density region 90 is the region depicting the background color A on the front surface and the smallest gradation value on the back surface. Accordingly, the high-density region 90 is a region most susceptible to show-through. The CPU 61 stores the high-density region 90 and the adjustment line in the RAM 63.

In the example of FIGS. 15A and 15B, high-density region 90 has line position Yd for pixel positions (Xd, Xe). Accordingly, the adjustment line is set to line position Yd. In this example, pixel positions (Xa+1, Xc) and (Xf+1, Xh) in the adjustment line correspond to the background color region BR1. These regions are called "background color region CR". The background color region CR is a portion of the background color region BR1 in which show-through does not occur.

In TD4 of FIG. 8, the CPU 61 determines whether the smallest gradation value is greater than or equal to the threshold value. If the smallest gradation value is greater than or equal to the threshold value (TD4: YES), in TD5 the CPU 61 performs a light density flag setting process to set a light density flag stored in RAM to ON, and subsequently ends the adjustment line establishment process (T6). However, if the smallest gradation value is smaller than the threshold value (TD4: NO), the CPU 61 simply ends the adjustment line establishment process (T6).

(Light Intensity Adjustment Process for Show-Through Removal)

Figure 9:
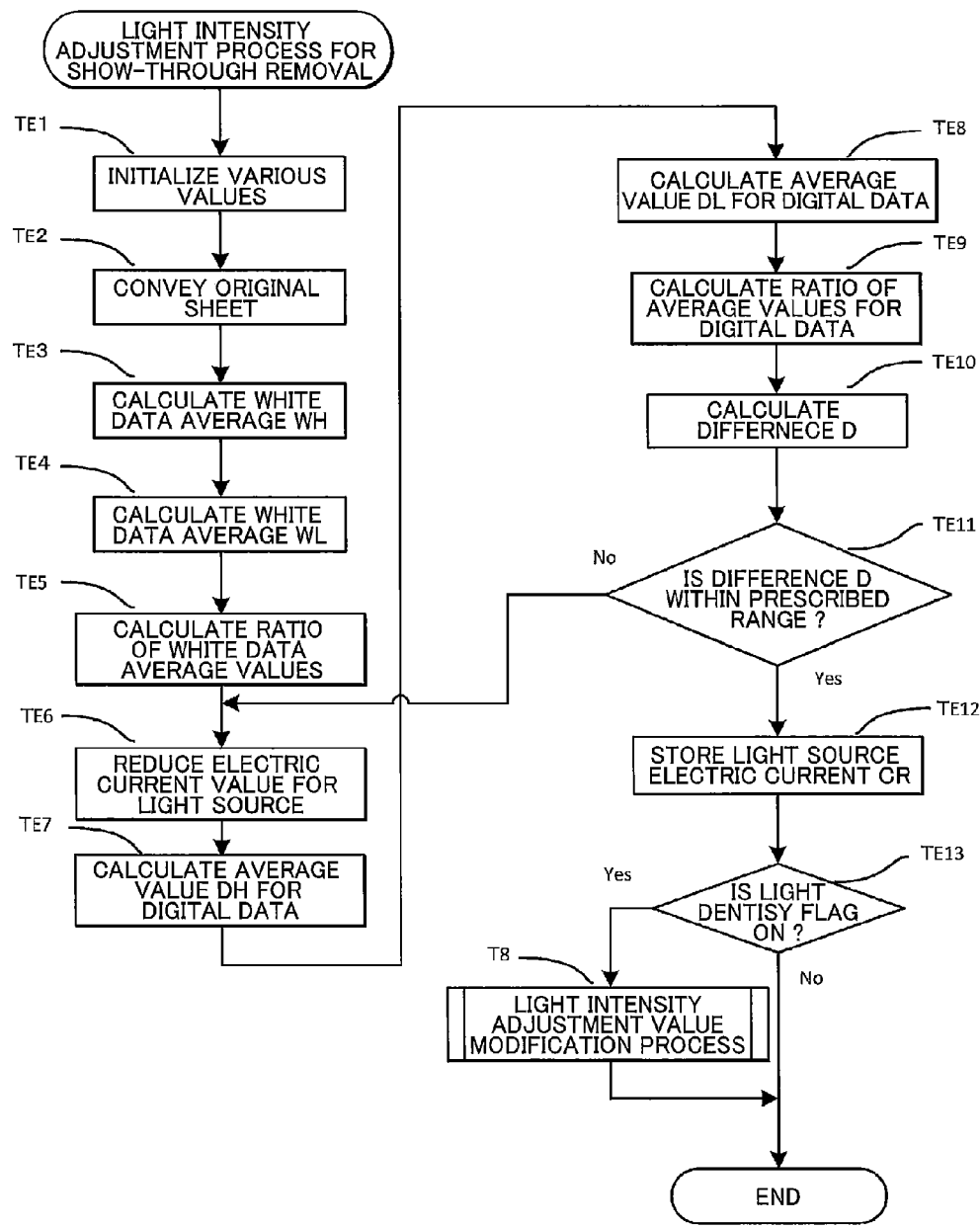
FIG. 9 is a flowchart illustrating steps in a light intensity adjustment process for show-through removal.

Next, the light intensity adjustment process for show-through removal (T7) will be described with reference to FIG. 9. In TE1, the CPU 61 initializes various values. Specifically, the CPU 61 sets the replacement flag to OFF to indicate that digital data converted from the analog signal in the read correction circuit 66 is to be written directly to the RAM 63. The CPU 61 further sets the electric current value for the light source 52 to its maximum value and initializes the line period, pixel period, color data, and light source ON signal. Here, the color data is initialized to the color produced when all three colors are illuminated simultaneously. Hence, the CPU 61 executes the process of T7 by illuminating all red, green, and blue light sources during one line.

In TE2 the CPU 61 outputs a drive command for controlling the ADF mechanism 41 to convey an original sheet until the adjustment line on the front surface of the original is positioned opposite the reading unit 50 at the read position RP. In TE3 the CPU 61 calculates a white data average WH of white data WS corresponding to the background color region CR. That is, the CPU 61 calculates the average value for white data WS corresponding to all pixels in the background color region CR as the white data average H. In TE4 the CPU 61 calculates a white data average WL for white data WS corresponding to the high-density region 90. That is, the CPU 61 calculates the average value for white data WS corresponding to all pixels in the high-density region 90 as the white data average WL.

In TE5 the CPU 61 calculates the ratio of the above average values for white data WS. In other words, the CPU 61 finds the ratio of average white data values by dividing the white data average WL for the high-density region 90 by the white data average WH for the background color region CR.

In TE6 the CPU 61 reduces the electric current value for the light source 52 by one step from its current setting. Note that when step TE6 is first performed following step TE5, the electric current value has been set to its maximum value in the initialization process of TE1. Hence, the first time step TE6 is performed, the CPU 61 reduces this electric current value one step from the maximum value. When step TE6 is subsequently performed after step TE11 described later, the CPU 61 reduces the electric current value for the light source 52 one step from its current value.

In TE7 the CPU 61 calculates an average value DH for digital data in the background color region CR. Specifically, the CPU 61 controls the reading unit 50 to execute a reading operation in order to acquire digital data from the read correction circuit 66 corresponding to the background color region CR. The CPU 61 then calculates the average value DH of the digital data acquired for the background color region CR.

In TE8 the CPU 61 calculates the average value DL for digital data in the high-density region 90. Specifically, the CPU 61 controls the reading unit 50 to execute a reading operation in order to acquire digital data from the read correction circuit 66 corresponding to the high-density region 90. The CPU 61 then calculates the average value DL of this digital data acquired for the high-density region 90.

In TE9 the CPU 61 calculates the ratio of average values for digital data found above. Specifically, the CPU 61 calculates the average digital data ratio by dividing the average value DL for digital data in the high-density region 90 by the average value DH for digital data in the background color region CR.

In TE10 the CPU 61 calculates a difference D. More specifically, the CPU 61 calculates the difference D between the white data ratio and the digital data ratio by subtracting the digital data ratio from the white data ratio.

In TE11 the CPU 61 determines whether the difference D is within a prescribed range. More specifically, the CPU 61 determines whether the difference D between the white data ratio and digital data ratio falls within a range such as 0.9-1.1. The CPU 61 advances to TE12 when the difference D falls within the prescribed range (TE11: YES), and returns to TE6 when the difference D falls outside the prescribed range (TE11: NO).

In TE12 the CPU 61 stores the electric current value currently set for the light source 52 in association with background color A and background color B as the light source electric current CR.

In TE13 the CPU 61 determines whether the light density flag is ON. Specifically, the CPU 61 determines whether the light density flag was set to ON in step TDS. If the light density flag is not ON (TE13: NO), the CPU 61 ends the process of T7. However, if the light density flag is ON (TE13: YES), the CPU 61 performs a process in T8 to modify the light source electric current CR, and subsequently ends the process of T7. The light intensity adjustment value modification process (T8) will be described next in greater detail.

(Light Intensity Adjustment Value Modification Process)

Figure 10:
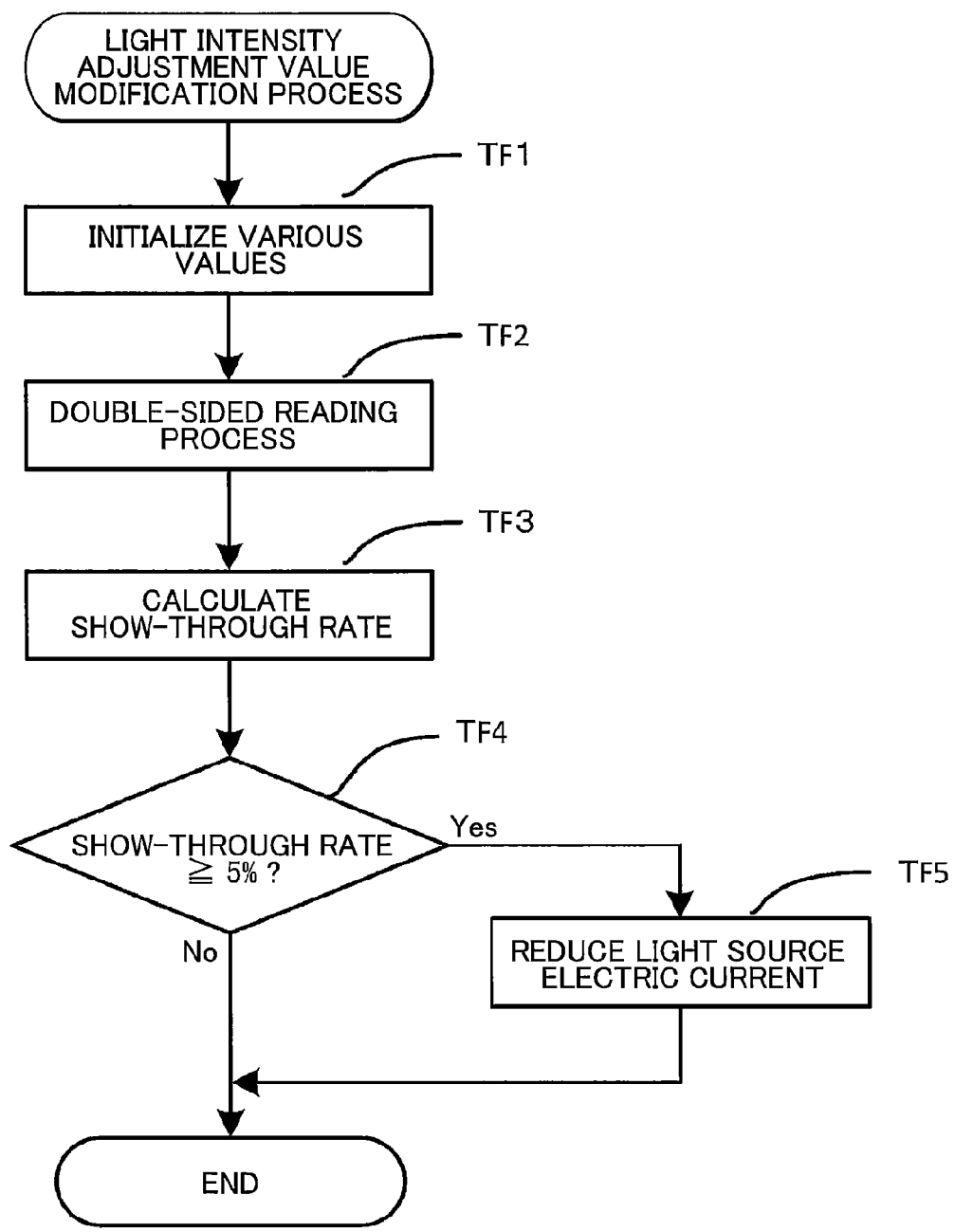
FIG. 10 is a flowchart illustrating steps in a light intensity adjustment value modification process.

Next, the light intensity adjustment value modification process (T8) will be described with reference to FIG. 10. In TF1 the CPU 61 initializes various values. For example, the CPU 61 initializes the line period and pixel period of the imaging element 51; and initializes the lighting start time, lighting end time, lighting color, and electric current value for the light source 52. In TF2 the CPU 61 acquires image data for both surfaces of the original. The process of TF2 is executed similarly to the process of T3 and the front image data and back image data are stored in the RAM 63.

In TF3 the CPU 61 calculates a show-through rate from the image data on both sides of the original sheet. More specifically, the CPU 61 compares a non-background color region AR2 comprising the entire region depicted by the front image data except for regions depicting the background color A and a non-background color region BR2 comprising the entire region depicted by the back image data except for regions depicting the background color B, and counts the number of pixels in the non-background color region AR2 that have the same pixel position and line position as pixels in the non-background color region BR2. The CPU 61 sets this count value as a matching pixel number. The CPU 61 calculates the show-through rate by dividing this matching pixel number by the total number of pixels in image data for one side of the original sheet.

In TF4 the CPU 61 determines whether the show-through rate is 5% or greater. The CPU 61 advances to TF5 when the show-through rate is 5% or greater (TF4: YES) and ends the T8 when the show-through rate is less than 5% (TF4: NO).

In TF5 the CPU 61 modifies the light source electric current CR. Specifically, the CPU 61 reduces the light source electric current CR by a prescribed amount (10%, for example). Here, the light source electric current CR represents the electric current value for the light source 52 needed to eliminate show-through.

(Main Reading Process)

Figure 11:
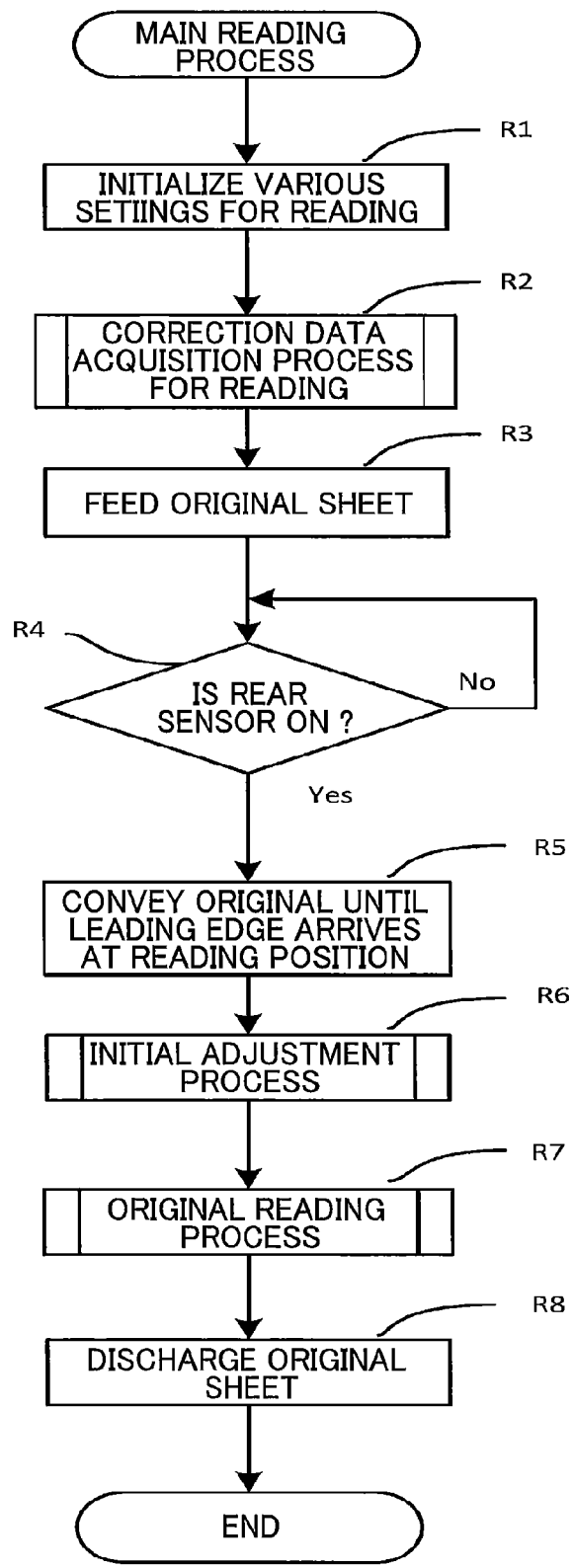
FIG. 11 is a flowchart illustrating steps in a main reading process.

The main reading process (M2) shown in FIG. 11 begins when the user places an original in the original tray 21 and presses a reading start button of the operating unit 70. That is, the CPU 61 starts the main reading process in response to a reading start command from the operating unit 70 when the original sensor 26 has detected an original.

In R1 at the beginning of the main reading process (M2), the CPU 61 initializes various setting values. For example, the CPU 61 initializes the line period and pixel period for the imaging element 51; and acquires the lighting start time, lighting end time, lighting color, and electric current value for the light source 52.

In R2 the CPU 61 acquires correction data. The correction data acquisition process for reading (R2) is performed to acquire white data WS, white data WR, and black data as correction data. This correction data is required for shading compensation. The process of R2 will be described later in greater detail.

In R3 the CPU 61 outputs a drive command to the drive circuit 68 to begin feeding an original sheet. In R4 the CPU 61 determines whether the rear sensor 27 is ON. The CPU 61 continues driving the drive circuit 68 to convey the original sheet while the rear sensor 27 is OFF (R4: NO). When the rear sensor 27 turns ON (R4: YES), in R5 the CPU 61 controls the drive circuit 68 to convey the original until the leading edge F of the original sheet arrives at the read position RP. Here, the leading edge F denotes a position shifted 3 mm toward the center of the original sheet in the sub scanning direction from the actual leading edge of the sheet in the conveying direction.

In R6 the CPU 61 executes an initial adjustment. The initial adjustment process (R6) is performed to acquire a characteristic value of the original and to determine the original type. The CPU 61 determines whether to set a show-through removal flag to ON based on the determination for the original type. This process will be described later in greater detail.

In R7 the CPU 61 executes a reading operation on the original based on the setting of the show-through removal flag. In other words, the CPU 61 executes a show-through removal reading process when the show-through removal flag is set to ON, and executes a normal reading process when the show-through removal flag is set to OFF. This process will also be described later in greater detail.

In R8 the CPU 61 outputs a drive command to the drive circuit 68 for discharging the original sheet. Once the original sheet has been discharged, the main reading process (M2) ends.

(Correction Data Acquisition Process for Reading)

Figure 12:
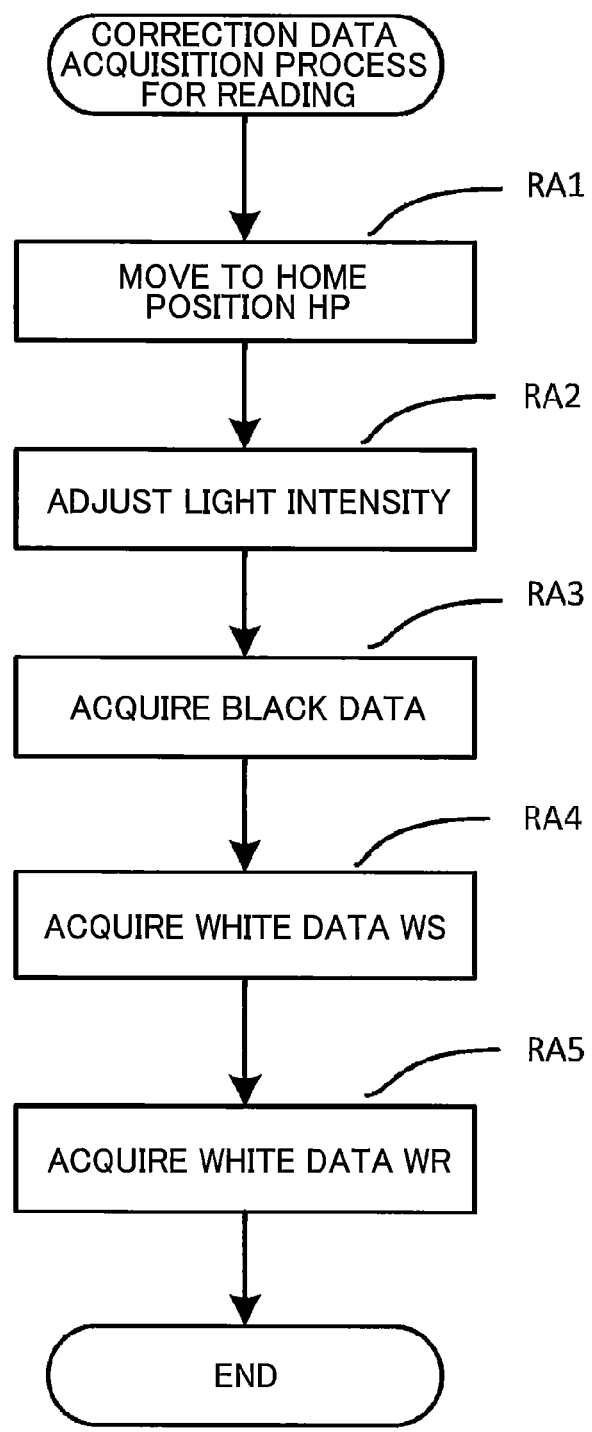
FIG. 12 is a flowchart illustrating steps in a correction data acquisition process for reading.

Next, the correction data acquisition process for reading (R2) will be described with reference to FIG. 12. In this process, steps RA1-RA4 are identical to steps TA1-TA4 in FIG. 5. Hence, the CPU 61 moves the reading unit 50 to the home position HP in RA1, adjusts the light intensity of the reading unit 50 to the light intensity IS in RA2, acquires black data after turning off the light source 52 in RA3, and acquires white data WS when lighting the light source 52 at the light intensity IS in RA4.

In RA5 the CPU 61 acquires the white data WR. Specifically, the CPU 61 controls the reading unit 50 to read one line worth of data while lighting the light source 52 at the light intensity IR, and stores the digital data produced from the read correction circuit 66 in the RAM 63 as the white data WR. After completing the process in RA5, the CPU 61 ends the correction data acquisition process for reading (R2).

(Initial Adjustment Process)

Figure 13:
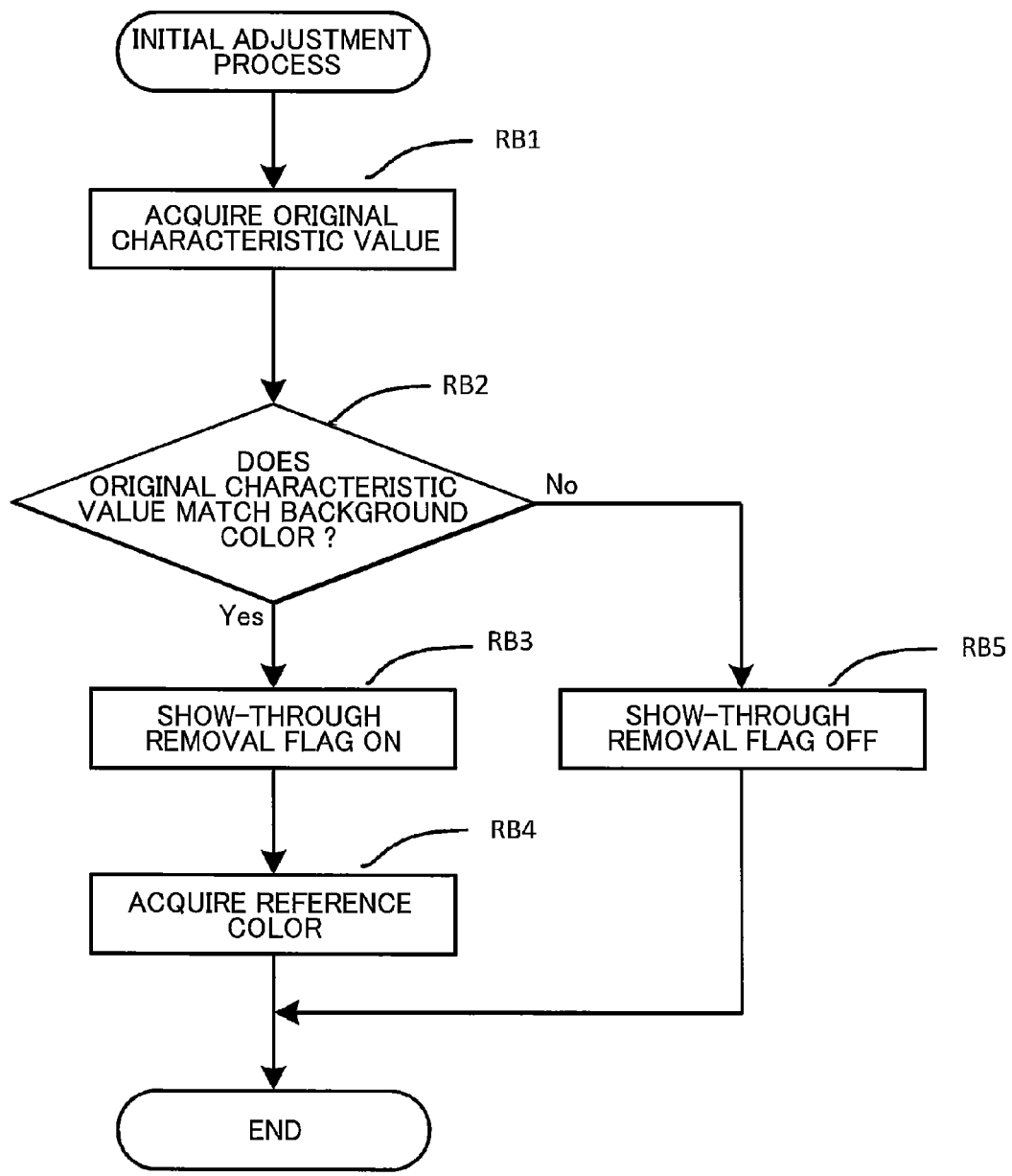
FIG. 13 is a flowchart illustrating steps in an initial adjustment process.

Next, the initial adjustment process (R6) will be described with reference to FIG. 13. In this process, the CPU 61 acquires one line worth of gradation values at the leading edge F of the original sheet, and creates a histogram recording the number of instances for each gradation value. In RB1 the CPU 61 identifies the gradation value having the highest frequency in the histogram as the original characteristic value.

In RB2 the CPU 61 determines whether the original characteristic value matches background color A or background color B. If the original characteristic value matches either background color A or background color B (RB2: YES), in RB3 the CPU 61 sets the show-through removal flag to ON and advances to RB4. However, if the original characteristic value does not match either background color A or background color B (RB2: NO), in RB5 the CPU 61 sets the show-through removal flag to OFF and ends the initial adjustment process (R6).

In RB4 the CPU 61 acquires the reference color. Specifically, the CPU 61 controls the light source 52 to turn on all three colors simultaneously, and sets the electric current value of the light source 52 to the light source electric current CR. The CPU 61 then controls the light source 52 to irradiate light onto the original and acquires gradation values for one line. Next, the CPU 61 creates a histogram recording the number of instances of each gradation value and identifies the gradation value having the highest frequency in the histogram as the reference color. After completing the process of RB4, the CPU 61 ends the initial adjustment process (R6).

(Original Reading Process)

Figure 14:
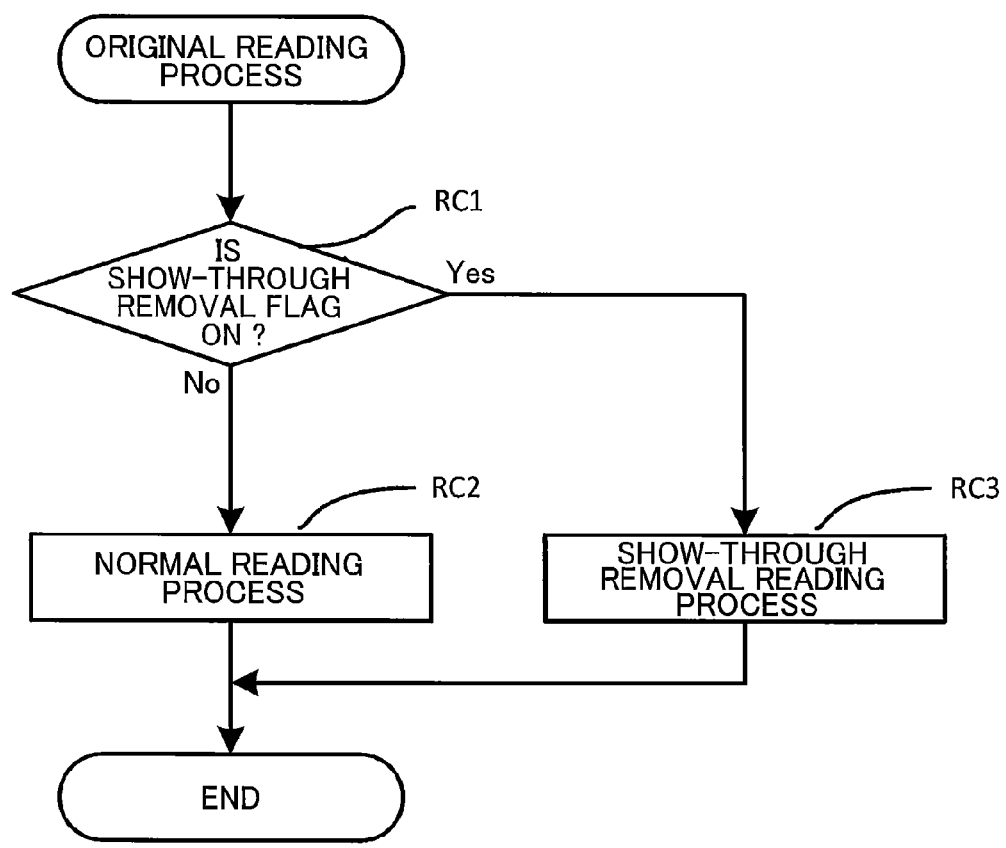
FIG. 14 is a flowchart illustrating steps in an original reading process.

Next, the original reading process (R7) will be described with reference to FIG. 14. In RC1 the CPU 61 determines whether the show-through removal flag is ON. The CPU 61 advances to RC3 when the show-through removal flag is ON (RC1: YES), and advances to RC2 when OFF (RC1: NO).

In RC2 the CPU 61 executes a normal reading process. That is, the CPU 61 controls the light source 52 to sequentially turn one of the red, green, and blue lights for each outputted line start signal TG. Hence, the CPU 61 executes a reading operation for one line each time the line start signal TG is outputted three times.

In RC3 the CPU 61 executes the show-through removal reading process. Thus, in addition to sequentially turning on the red, green, and blue lights, the CPU 61 controls the light source 52 to also turn on all three colored lights simultaneously. The CPU 61 determines whether show-through occurs based on the reading results obtained when all three lights are turned on simultaneously and can execute a show-through removal process using the data replacement unit 87 when performing the reading operation. After completing either the normal reading process in RC2 or the show-through removal reading process in RC3, the CPU 61 ends the original reading process (R7).

<Effects of the Embodiment>

In TD1-TD3 of the adjustment line establishment process (T6) in the preferred embodiment, the CPU 61 acquires the background color region AR1, background color region BR1, and adjustment line and stores the adjustment line as a line that includes both the background color region CR and the high-density region 90. In the light intensity adjustment process for show-through removal T7, the CPU 61 conveys the original sheet to the adjustment line and performs a light intensity adjustment for show-through removal. That is, the background color region BR1 including the background color region CR is the region most susceptible to light from the light source 52 being transmitted therethrough since both the front image data and back image data depict the background color. Conversely, the high-density region 90 is the region that is most susceptible to show-through since the front image data depicts the background color while the back image data depicts a high density. By adjusting the light intensity of the light source 52 on this adjustment line, which includes both regions described above, the image-reading device 1 can set a light intensity suitable for reducing the occurrence of show-through in all regions of the original.

In the light intensity adjustment process for show-through removal T7 described in the preferred embodiment, the CPU 61 calculates the ratio of average white data values in TE5, calculates the ratio of average gradation values in TE9, determines whether the difference between these ratios falls within a prescribed range in TE11, and adjusts the light intensity in TE6 until the difference in ratios is within the prescribed range. Accordingly, the image-reading device 1 can adjust the light intensity, even when variation in the distribution of light emitted from the light source 52 causes great fluctuations in digital data.

[Correlations Between the Embodiment and Claims]

The image-reading device 1 is an example of claimed "an image-reading device", the reference plate 33 is an example of claimed "a reference plate", and the ADF mechanism 41 is an example of claimed "a conveying unit". The imaging element 51 is an example of claimed "reading unit", and the light source 52 is an example of claimed "a light source". The CPU 61 is an example of claimed "a controller", the correction unit 82 is an example of claimed "correction unit", and the read signal generation circuit 65 is an example of claimed "adjusting unit". The background color region CR is an example of claimed "a non-show-through region", and the high-density region 90 is an example of claimed "a show-through region".

[Variations]

While the description has been made in detail with reference to specific embodiment thereof, it would be apparent to those skilled in the art that various changes and modifications may be made therein without departing from the spirit and scope of the above described embodiment. The following are sample variations to the embodiment.

(1) The image-reading device 1 according to the preferred embodiment may be employed in a multifunction peripheral provided with a printing unit. Further, while the image-reading device 1 of the preferred embodiment is provided with a single reading unit 50, the image-reading device of the present disclosure may include two reading units for reading both surfaces of the original.

(2) The method of show-through removal described in the embodiment is performed when reading an original in color using the three colors of light red, green, and blue, but the show-through removal process may be executed using a single color when reading images in monochrome, as well as using a plurality of colors. Here, a show-through removal process for monochromatic reading may be implemented by using just one of the R data holding unit 84, B data holding unit 85, and G data holding unit 86 in the monochrome mode.

(3) The preferred embodiment describes a method of adjusting the light source electric current RR when turning on all three colored lights simultaneously as the light intensity for show-through removal. However, the image-reading device may adjust the light intensity by modifying the lighting color and lighting time.

(4) In the preferred embodiment, the CPU 61 executes all steps in the light intensity adjusting pre-process described in FIG. 4 and the main reading process described in FIG. 11, but the present disclosure is not limited to this configuration. For example, the image process circuit 67 may be configured to execute some of the steps T4-T6 in the light intensity adjusting pre-process and step R6 in the main reading process.

(5) The method described in the preferred embodiment for adjusting the light intensity uses the ratio of white data and the ratio of digital data, but another method may be used. For example, rather than using the ratio of digital data, the image-reading device may adjust the light intensity so that the ratio of white data becomes a predetermined ratio, or may simply adjust the light intensity to a prescribed value without using the ratio of white data.

What is claimed is:

1. An image-reading device comprising:
a light source configured to irradiate light toward an original having a first face and a second face, the light irradiated theretoward having a light intensity;
a reading unit configured to read the original on a line-to-line basis in a main scanning direction by receiving the light reflected off the original;
a reference plate disposed in a position confronting the reading unit;
an adjusting unit configured to adjust the light intensity of the light source; and
a controller configured to:
control the light source to irradiate the light toward the reference plate and control the reading unit to read the reference plate to generate reference image data;
control the light source to irradiate the light toward the first face of the original and control the reading unit to read the first face of the original to generate first image data corresponding to the first face of the original;
control the light source to irradiate the light toward the second face of the original and control the reading unit to read the second face of the original to generate second image data corresponding to the second face of the original;
acquire a first background color from the first image data and a second background color from the second image data;
identify a first background color region in the first image data and a second background color region in the second image data, the first background color region defining a region in which the first face of the original depicts the first background color, the second background color region defining a region in which the first face of the original depicts the first background color and the second face of the original depicts the second background color;
acquire a highest density value in the first background color region from the second image data;
identify a show-through line including a show-through region and a non-show-through region in the second image data based on the second background color and the highest density value, the show-through region corresponding to the highest density value, the nonshow-through region defining a region in which the first face of the original depicts the first background color and the second face of the original depicts the second background color;

control the light source to irradiate the light toward the first face of the original and control the reading unit to read the show-through region and the non-show-through region in the first face of the original to generate third image data and fourth image data;

calculate an image data ratio of the third image data to the fourth image data;

calculate a reference data ratio of first reference data to second reference data, the first reference data being image data corresponding to the show-through region in the reference image data, the second reference data being image data corresponding to the non-show-through region in the reference image data;

calculate a difference between the image data ratio and the reference data ratio and determine a show-through removal light intensity such that the difference falls within a prescribed range; and control the adjusting unit to adjust the light intensity of the light source to the show-through removal light intensity.

2. The image-reading device according to claim 1, wherein the controller is configured to:

identify first pixel positions and first line positions of the first background color region and second pixel positions and second line positions of the second background color region, the first pixel positions being pixel positions of the first background color region in the main scanning direction, the first line positions being line positions of the first background color region in a sub scanning direction orthogonal to the main scanning direction, the second pixel positions being pixel positions of the second background color region in the main scanning direction, the second line positions being line positions of the second background color region in the sub scanning direction;

acquire the highest density value among the first pixel positions corresponding to the first line positions included in the second line positions; and identify the show-through line based on a line position of the highest density value in the sub scanning direction, the show-through region being identified by a pixel position of the highest density value in the main scanning direction, the non-show-through region being identified by the second pixel positions on the show-through line.

3. The image-reading device according to claim 1, further comprising a correction unit configured to correct the first image data and the second image data based on the reference image data, wherein the controller is configured to acquire the first background color from the corrected first image data and the second background color from the corrected second image data.

4. The image-reading device according to claim 1, wherein the controller is further configured to control the light source to irradiate the light toward the original with the show-through removal light intensity and control the reading unit to read the original to generate show-through removal image data.

5. The image-reading device according to claim 4, further comprising a replacement unit;

wherein the controller is further configured to:
acquire a reference color from the show-through removal image data;
identify a reference color region in the show-through removal image data;
control the reading unit to read at least one of the first face and the second face of the original to generate image data; and
control the replacement unit to replace the reference color region in the image data with the reference color.

6. The image-reading device according to claim 1, further comprising a memory configured to store a characteristic value of the original for determining a type of the original and the show-through removal light intensity correspondingly, wherein the controller is further configured to:
control the light source to irradiate the light toward an original and control the reading unit to read the original to acquire an original characteristic value; and
acquire show-through removal light intensity stored in the memory corresponding to the original characteristic value.

7. The image-reading device according to claim 1, wherein the controller is further configured to:

acquire an overall highest density value from the second image data;

calculate a density threshold based on the overall highest density value;

determine whether the highest density value is lower than the density threshold value;

calculate an area ratio of a matching area to an original area, the matching area being an area of a region in which the first face does not depict the first background color and the second face does not depict the second background color if the highest density value is lower than the density threshold value;

determine whether the area ratio falls within a predetermined range; and reduce the show-through removal light intensity if the area ratio is not within the predetermined range, and unchanged the show-through removal light intensity if the area ratio is within the predetermined range.

\* \* \* \* \*